United States Patent [19]

Updegrave

[11] 4,043,210

[45] Aug. 23, 1977

[54] ROTATOR DRIVE SYSTEM

[75] Inventor: Walter C. Updegrave, Reading, Pa.

[73] Assignee: Reading Techmatic Corporation, Reading, Pa.

[21] Appl. No.: 634,302

[22] Filed: Nov. 19, 1975

Related U.S. Application Data

[63] Continuation of Ser. No. 464,075, April 25, 1974, abandoned.

[51] Int. Cl.² ............................................. F16H 3/44
[52] U.S. Cl. ..................................... 74/750 R; 74/801
[58] Field of Search ...................... 74/750 R, 785, 788, 74/789, 797, 801, 805; 64/3, 4, 31

[56] References Cited

U.S. PATENT DOCUMENTS

| 474,903 | 5/1892 | Cottrell | 74/805 |
| 2,690,685 | 10/1954 | Donandt | 74/785 |
| 2,893,268 | 7/1959 | Liebel | 74/801 |
| 3,369,672 | 2/1968 | Lorence | 74/805 |

Primary Examiner—Samuel Scott
Assistant Examiner—Frank H. McKenzie, Jr.
Attorney, Agent, or Firm—Caesar, Rivise, Bernstein & Cohen, Ltd.

[57] ABSTRACT

A planetary drive system especially useful in the transmission of high torques is disclosed. An internal ring gear is fixed to a base on which a rotator is mounted. A plurality of planet gears mounted on the rotator engage the ring gear. A driven sun gear imparts translational motion to the planet gears relative to the fixed ring gear, thereby driving the rotator. The planet gears and sun gear are mounted to permit radial movement with respect to the ring gear so that the sun gear and planet gears are self-centering, and lack of perfect roundness of the ring gear can be accommodated.

21 Claims, 3 Drawing Figures

U.S. Patent     Aug. 23, 1977     4,043,210
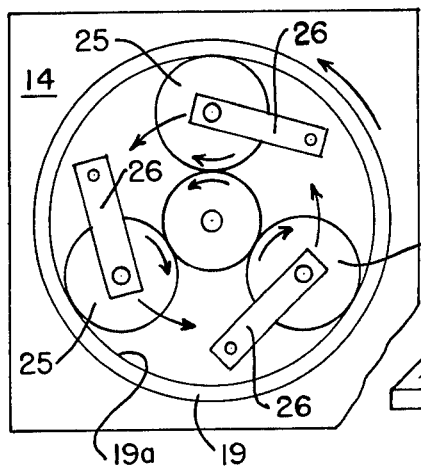
FIG. 3
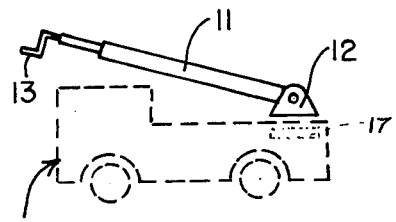
FIG. 1
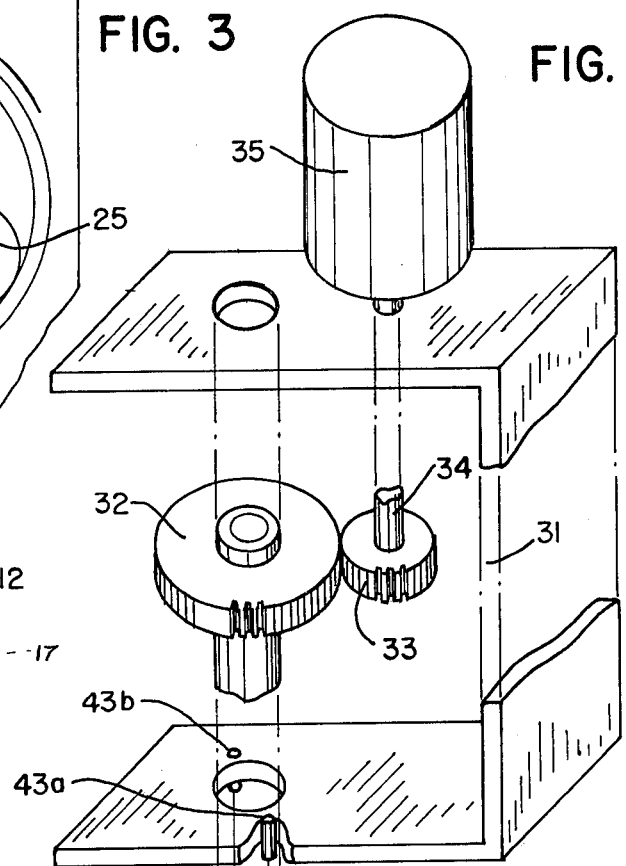
FIG. 2
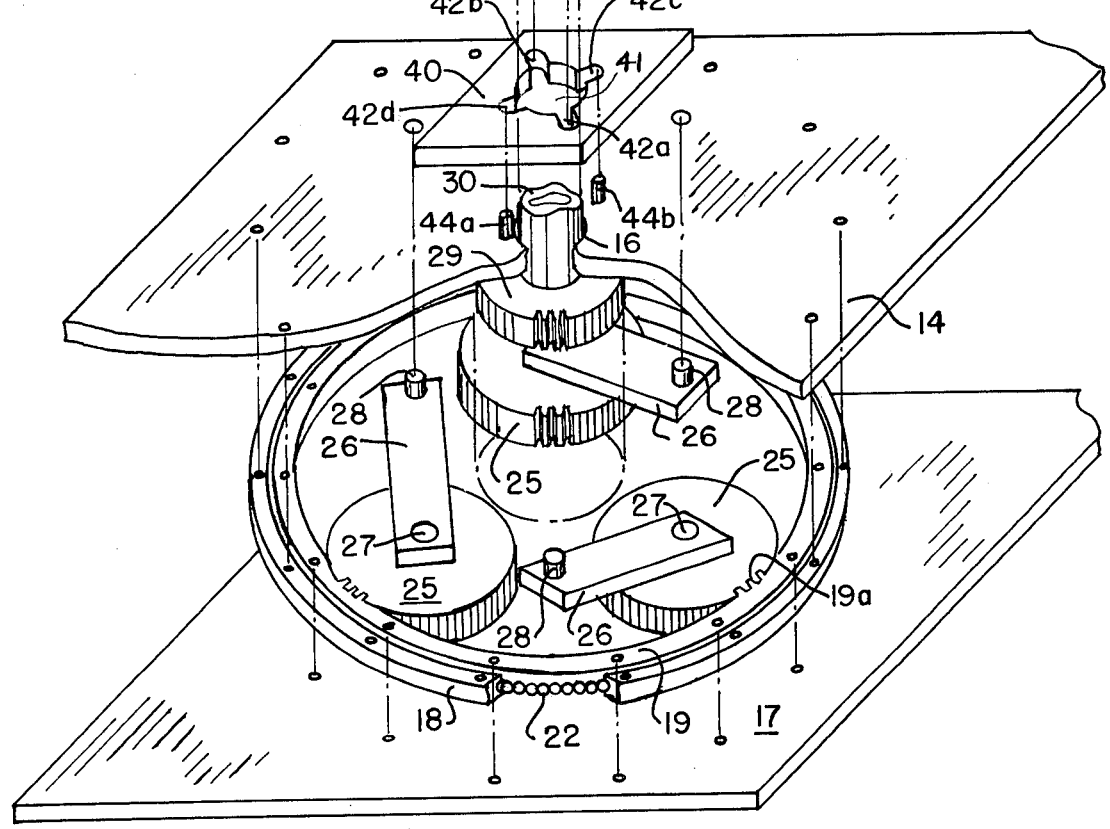

ROTATOR DRIVE SYSTEM

This is a continuation of application Ser. No. 464,075, filed Apr. 25, 1974, now abandoned.

BACKGROUND OF THE INVENTION

1. Field of the Invention

This invention relates to high torque drive systems. The invention has particular applicability to drive systems for vehicle-mounted rotators which carry booms.

2. Description of the Prior Art

There are currently in use many types of vehicles which carry rotatably mounted booms. In most instances the boom is mounted on a pedestal or platform (sometimes called a "rotator") that incorporates a drive system for moving the pedestal arcuately in a horizontal plane relative to the vehicle. Some examples of these are the so-called "cherry-picker" devices (used for raising a man off the ground to enable him to repair power lines, cut tree limbs, etc.), earth-moving equipment such as backhoes, lifting cranes and fire-fighting equipment. In normal use, it is common that the booms are subjected to forces directed transversely with respect to the longitudinal axis of the boom. Many of these booms are extensible and can exceed 75 feet in length when fully extended. Therefore, when a transverse force is applied at the end of the boom, a high torque load is placed on the system which supports and drives the rotator.

One example that illustrates the foregoing is a water tower-type fire truck. In this apparatus, either a telescoping or articulated boom is mounted on a truck chassis by a rotatable pedestal. A liquid extinguishant, commonly water, is pressurized by pumps mounted on the truck and is supplied through the boom to a nozzle mounted on the upper end of the boom. Such nozzles are commonly mounted for rotation relative to the boom in both horizontal and vertical planes. As the jet of water leaves the nozzle, it subjects the nozzle to a reaction force opposite in direction to the direction of the jet. This must be resisted by the boom in order to maintain the nozzle in position. When the nozzle is rotated in a horizontal place so that the longitudinal axis of the nozzle is not coincident with the longitudinal axis of the boom, a turning moment is created by the nozzle reaction force which is applied at the end of a rather long moment arm, namely, the extended boom. Accordingly, it is not unusual for the rotation means for this type of apparatus to be designed to transmit in the order of 300,000 inch-pounds of torque.

In equipment of known design, a large gear is non-rotatably mounted on the vehicle chassis concentrically with the axis of rotation of the rotator. A drive motor is mounted on the rotator and the drive motor drives a pinion which engages the fixed gear. The platform is caused to rotate as the pinion travels about the periphery of the fixed gear. A drawback of this design is that in order to obtain the necessary reduction in drive ratio between the pinion and the ring gear to enable the rotation of the rotator, it is necessary to employ a large, fixed gear and a small pinion. The relatively small pinion is less capable of sustaining the high torque loads produced by forces acting on the boom. A problem that has occurred is that the teeth of the pinion are broken off, and the drive system thereby disabled.

Planetary transmissions comprised of a sun gear, a plurality of planet gears, and an internal ring gear are, of course, known. However, the machining and assembly tolerances required in such transmissions are high. It is especially difficult and costly to achieve these tolerances in large transmissions, such as are necessary for rotating vehicle-mounted booms as herein disclosed. Some efforts have been made to circumvent the tolerance problem by mounting the planet gears on eccentrics or levers to allow radial movement of the planet gears relative to the sun gear and the ring gear. Such systems do not accommodate eccentricities of the ring gear.

SUMMARY OF THE INVENTION

According to the invention herein disclosed, a planetary drive system is utilized to impart rotation to a rotatable member. A plurality of planet gears engage a sun gear. An internal ring gear surrounds, and is in engagement with, the planet gears. The planet gears or the ring gear may be affixed to the rotatable member. When the sun gear is driven by a drive motor, the planet gears move translationally within the ring gear, thereby causing the rotatable member to rotate. The planet gears may be mounted for radial movement on swinging arms. The sun gear and its associated drive system, or the ring gear, are mounted for radial movement relative one to the other by a radially shiftable coupling member. By reason of the yieldable mounting, the drive system is self-centering, and lack of dimensional tolerances in the internal ring gear can be accommodated.

BRIEF DESCRIPTION OF THE DRAWINGS

FIG. 1 is a schematic illustration of a vehicle having an extensible boom mounted on a rotator;

FIG. 2 is a schematic isometric disassembled view of the rotator drive system; and FIG. 3 is a view from beneath the rotator showing the directions of movement of various parts when the sun gear is rotated in a given direction.

DESCRIPTION OF THE PREFERRED EMBODIMENT

There is shown in FIG. 1 a vehicle 10 having a rotator 12 rotatably mounted on its chassis. A boom 11, articulated, or, as here illustrated, telescopic, is mounted on rotator 12.

The boom 11 is mounted on the rotator 12 by means of suitable bearing support that allows the boom to move arcuately in a vertical plane from a position adjacent the truck to an elevated position, thereby lifting a working member such as nozzle 13, which is mounted at the end of the boom, above the ground.

The rotator 12 is mounted to the vehicle chassis for rotation in a horizontal plane about a generally vertical axis. The rotator includes a drive system, disclosed in greater detail below, for rotating the rotator in either direction about its axis of rotation. Because the boom is mounted to the rotator, it is moved arcuately through the same angular distance as the rotator. The controls for controlling the rotation of the rotator, the elevation of the boom, and the positioning of the nozzle may be mounted on the rotator or elsewhere on the vehicle.

Turning to FIGS. 2 and 3, there is shown a preferred mounting and drive system for the rotator 12. The rotator includes a platform or floor 14 having a generally centrally located opening 16.

A base 17, which is adapted to be mounted on a supporting structure such as a vehicle chassis, supports the rotator 12. The rotator is mounted on the base 17 by means of an outer bearing race 18 which is mounted on the underside of the platform 14, and an inner bearing race 19 which is mounted on the base 17.

Bearing means are positioned between the outer bearing race 18 and the inner bearing race 19. For example, in the preferred embodiment, concave semicircular grooves are formed on the inner periphery of the outer bearing race 18 and the outer periphery of the inner bearing race 19, and constitute outer and inner races respectively of a ball bearing assembly. A plurality of bearing balls 22 are disposed between the outer race 18 and the inner race 19. Thus, the rotator 12 is capable of rotating with respect to the base 17 about the axis of the above-noted ball bearing assembly, but is constrained against lateral and axial movement by the above-described bearing assembly.

The inner periphery of the track bearing 19 is toothed, thereby forming an internal circular ring gear 19a. A plurality of planet gears 25 are disposed below the platform 14 and mesh with the teeth on the inner periphery of the track bearing 19. In the preferred embodiment, as illustrated in FIGS. 2 and 3, there are three planet gears arranged so that the axis of rotation of the planet gears 25 are as close to being spaced 120° apart as the number of teeth of the sun gear and the ring gear will permit.

Turning to FIG. 2, each of the planet gears is mounted on the underside of the platform 14 by one of the floating arms 26. One end of each arm 26 carries one of the planet gears 25 which is mounted or rotation, for example, by means of shafts 27. The opposite end of each arm 26 is pivotally mounted to the underside of the platform 14, for example, by means of pins 28. Thus, the platform 14 acts as the carrier for the planet gears in the planetary drive system described herein.

A sun gear 29 is mounted for rotation with respect to the rotator 12 and engages the planet gears 25. In the preferred embodiment, the sun gear is mounted on and driven by a shaft 30 which extends upwardly through the opening 16 in the floor 14 of the rotator. The shaft 30 is rotatably mounted in a housing 31. A drive gear 32 is fixedly mounted on the upper end of the shaft 30. A drive pinion 33 is also rotatably mounted in the housing 31 by means of output shaft 34 of a suitable motor and reducer unit 35. The motor reducer unit is preferably of a hydraulically-driven, automatically locking type.

In order to provide for lack of concentricity between the sun gear, the planet gears and the ring gear, the planet gears and the sun gear are mounted for radial movement with respect to the ring gear 19a. As heretofore mentioned, the planet gears are yieldably mounted by means of the floating arms 26. Radial movement of the sun gear 25 with respect to the ring gear is accomodated by a coupling plate 40 in the following manner. Referring to FIG. 2, in the preferred embodiment, the coupling plate 40 is disposed between the housing 31 and the platform 14 of the rotator. The coupling plate supports the housing 31 and, necessarily, the sun gear 29 and the drive system for driving the sun gear. The top and bottom of the coupling plate are smooth so that the plate is capable of sliding relative to the platform 14 and housing 31. The coupling plate 40 includes an aperture 41 through which the shaft 30 passes. Two pairs of opposed slots 42a, 42b, and 42c, 42d, extend from the aperture 41 into the body of the coupling plate. The centerline of slot 42a is aligned with the centerline of slot 42b. The pair of slots 42c, 42d are similarly aligned. In the preferred embodiment, the pairs of slots are diametrically opposite and are arranged so that the centerline on the pair of slots is orthogonal to the centerline of the other pair of slots although other arrangements of slots wherein the centerlines of the slots do not extend diametrically or are arranged at some angle other than 90° to each other are believed to be usable. The slots 42a and 42b each receive one of the pins 43a, 43b, which depend from the housing 31. The pins 43a, 43b, and the slots 42a, 42b are dimensioned so that the plate 40 is precluded from rotating relative to the housing 31, yet permits relative radial movement between the plate 40 and the housing 31 on the pins 43a, 43b. Similarly, a pair of pins 44a and 44b extend upwardly from the floor 14 of the rotator. The pins 44a and 44b are positioned to engage the pair of opposed slots 42c, 42d in the manner as heretofore described with respect to the pins 43a and 43b. Thus, the coupling plate 40 is precluded from rotation with respect to the floor 14, but radial sliding movement of the plate 40 relative to the floor 14 is permitted.

Thus, the coupling plate 40, acting in conjunction with the pins 43a, 43b, and 44a, 44b, couples the housing 31 to the platform 14 in a manner such that the housing 31 cannot rotate with respect to the platform 14. However, the housing 31 is capable of being shifted transversely with respect to the platform 14.

It should also be noted that the sun gear and its associated drive system could also be similarly mounted on a fixed base, such as base 17, rather than on the platform 14 of rotator 12 as shown. In such an arrangement, the coupling plate and cooperating pins would be disposed between the housing 31 and the fixed base.

It should also be noted that the arrangement of parts can be reversed. That is, the planet gears can be mounted on the vehicle chassis and the internal ring gear mounted on the bottom of the platform 14. In this case, the input assembly carrying the sun gear can be mounted on the vehicle chassis or on the platform 14. In both cases, a coupling plate is utilized to mount the input assembly so that the sun gear can be radially shifted. The planet gears are also mounted for radial movement with respect to the ring gear.

In addition, the ring gear could be floatingly mounted between the chassis and the rotator platform by means of a coupling plate and pins similar to, but necessarily of larger size than the arrangement as previously described in connection with coupling plate 40. In this instance, the input assembly and the planet gears could be fixedly mounted and the ring gear would be capable of travelling in an orbital or epicyclic path, thereby allowing for variations in concentricity of the ring gear.

It should be further noted that shaft 30 is preferably hollow so that various fluids can be supplied to the rotator. For example, in a typical water tower fire truck, conduits (not shown) carrying water under pressure and hydraulic fluid under pressure extend upwardly from the truck chassis through the hollow shaft 30 to the rotator 12.

Referring to FIGS. 2 and 3, the drive system rotates the platform 14 in the following manner. When the motor and reduction unit 35 drives pinion 33, for example, in a clockwise direction, the drive gear 32 and the sun gear 29 are driven in a counterclockwise direction as shown in FIG. 3. The sun gear 29 drives the planet gears 25 in a clockwise direction, thereby causing the planet gears 25 to move translationally in a counterclockwise direction about the sun gear 29. The translational movement of the planet gears 25 is in turn imparted to the platform 14 through the floating arms 26 acting through pins 28, thereby causing the platform 14 to rotate in a counterclockwise direction.

Pins 43a, 43b, and 44a, 44b, prevent the housing 31 from rotating with respect to the platform 14, and thus cause the torque to be transmitted through drive gear 32 and shaft 30 to sun gear 29, causing the platform to be driven in the manner as described above. The sun gear 29 is, however, capable of shifting laterally in radial directions with respect to the ring gear 19a and planet gears 25 by reason of the fact that the housing 31 and coupling plate 40 can slide relative to the platform 14 on the pins 44a, 44b, in the direction of slots 42c, 42d, and the housing 31 can shift relative to the coupling plate on the pins 43a, 43b, in the direction of the slots 42a, 42b. If, for example, ring gear 19a and sun gear 29 are not concentrically mounted, the sun gear can be shifted radially by the planet gears bearing against the sun gear at the point where the distance between the sun gear and the ring is the least. This lateral force is communicated to housing 31 through shaft 30 and the housing may be caused to slide relative to the coupling plate along the direction of slots 42a, 42b, and the coupling plate and housing may be caused to slide relative to the platform 14 along the direction of slots 42c, 42d. In this manner, the sun gear and planet gears become centered with respect to the ring gear.

In a similar manner, noncircularity of the ring gear or eccentricity of the bearing races with respect to the ring gear can be accomodated. In this case, as platform 14 rotates, the position of the coupling plate 40 is continuously shifting and it may be caused to move in an orbital or epicyclic path having components of motion along the axes defined by each set of slots 42a, 42b and 42c, 42d.

It should be realized that the motor reducer unit 35 is reversible, and thus is capable of driving the platform 14 in the opposite direction from that described above, in which case the various elements are merely rotated in a direction opposite to that previously described.

As has been heretofore noted, the motor reducer unit 35 is preferably of a locking type so that the drive system, and therefore the rotator, stays locked in the position in which it is set.

An advantage of the drive system herein disclosed is that high torque loads externally applied to the rotator are distributed evenly over a plurality of relatively large planet gears. Because these loads are so distributed, the likelihood of gear teeth being sheared off the planet gears or the sun gear is greatly reduced in comparison to systems employing a single drive pinion.

In addition, the foregoing benefits can be achieved at a relatively lower cost because the yieldable mounting of the planet gears and sun gear results in a self-aligning system requiring lower tolerance levels, and an accompanying reduction in the cost of machining and assembling the system.

Also, commercially available ring bearings of the type heretofore disclosed are generally not constructed to high tolerance levels, mainly because of cost considerations. As a result, such bearing assemblies have low radial capacities; radial loads will reduce the thrust and moment capacities of the bearing. An advantage of the disclosed drive system is that radial loads resulting from gear tooth forces are substantially cancelled so that radial loading of the bearing is minimized, thereby allowing the use of the lower cost, readily available bearing assemblies.

While the foregoing description has been set in the environment of vehicle-mounted rotators, it should be realized that the drive system disclosed can equally well be used with non-vehicle-mounted equipment.

I claim:

1. A drive system for a rotatable member comprising a shaft rotatably mounted relative to the rotatable member, a drive means for driving the shaft, a sun gear mounted on the shaft, a ring gear, a support, means for fixedly mounting the ring gear on the support, at least two rotatable planet gears in engagement with the sun gear and the ring gear, the axes of rotation of the planet gears, the sun gear and its shaft being substantially parallel, means mounting the planet gears on the rotatable member and coupling means interconnected between said drive means and said rotatable member for allowing the axis of rotation of the shaft to shift radially relative to the ring gear with motions which lie in a plane to which said axes of rotation of said planet gears are perpendicular with the axis of rotation of said sun gear, said shaft and said planet gears remaining parallel as said axis of rotation of said shaft shifts radially.

2. A drive system for a rotatable member as in claim 1 wherein the coupling means mounts the sun gear for radial movement with respect to the ring gear.

3. A drive system for a rotatable member as in claim 2 wherein the sun gear and the drive system for driving the sun gear are mounted on the rotatable member.

4. A drive system for a rotatable member as in claim 2 wherein the means for mounting the planet gears on the rotatable member comprise means for allowing the planet gears to move radially with respect to the ring gear.

5. A drive system for a rotatable member as in claim 1 which further comprises bearing means for rotatably mounting the rotatable member with respect to the ring gear.

6. A drive system for a rotatable member comprising a shaft rotatably mounted relative to the rotatable member, a drive means for driving the shaft, a sun gear mounted on the shaft, a ring gear, a support, means for fixedly mounting the ring gear on the support, at least two rotatable planet gears in engagement with the sun gear and the ring gear, the axes of rotation of the planet gears being substantially parallel, means mounting the planet gears on the rotatable member and coupling means for allowing the axis of rotation of the shaft to shift radially relative to the ring gear solely in directions substantially orthogonal to the axes of rotation of the planet gears wherein the coupling means comprises a member interposed between the drive means and the rotatable member, first interconnecting means mounted on the drive means for slidably engaging the coupling means and for preventing the rotation of the drive means with respect to the coupling means, and second interconnecting means mounted on the rotatable member for slidably engaging the coupling means and for preventing the rotation of the coupling means with respect to the rotatable member.

7. A drive system for a rotatable member as in claim 6 wherein the coupling means is a plate having at least two pairs of slots and the first and second interconnecting means are pins slidably received in the slots.

8. A drive system for a rotatable member comprising a shaft rotatably mounted relative to the rotatable member, a drive means for driving the shaft, a sun gear mounted on the shaft, a ring gear, a support, means for fixedly mounting the ring gear on the support, at least two rotatable planet gears in engagement with the sun gear and the ring gear, the axes of rotation of the planet gears being substantially parallel, means mounting the planet gears on the rotatable member and coupling means for allowing the axis of rotation of the shaft to shift radially relative to the ring gear solely in directions substantially orthogonal to the axes of rotation of the planet gears wherein the coupling means in interconnected between the drive means and said rotatable member and comprises a plate engaging the drive means and further including interconnecting means mounted on the drive means for slidably engaging the coupling means and for preventing rotation of the coupling means with respect to the drive means.

9. A drive system for a rotatable member as in claim 8 wherein the coupling means comprises a plate having slots therein and the interconnecting means comprises pins adapted to be received in the slots in the plate.

10. A vehicle comprising a chassis, a rotatable member mounted on the chassis, a shaft rotatably mounted relative to the rotatable member, a drive means for driving the shaft, a sun gear mounted on the shaft, a ring gear, means for fixedly mounting the ring gear on the chassis, at least two rotatable planet gears in engagement with the sun gear and the ring gear, the axes of rotation of the planet gears and said shaft being substantially parallel, means mounting the planet gears on the rotatable member and coupling means interconnected between said drive means and said rotatable member for allowing the axis of rotation of the shaft to shift radially relative to the ring gear solely in directions substantially orthogonal to the axes of rotation of the planet gears with said axis of said shaft remaining parallel to said axes of said planet gears as said shaft shifts radially.

11. A vehicle as in claim 10 wherein the coupling means mounts the sun gear for radial movement with respect to the ring gear.

12. A vehicle as in claim 11 wherein the means for mounting the planet gears on the rotatable member comprise means for allowing the planet gears to move radially with respect to the ring gear.

13. A vehicle as in claim 10 which further comprises bearing means for rotatably mounting the rotatable member with respect to the ring gear.

14. A vehicle as in claim 10 and further comprising a boom mounted on the rotatable member.

15. A vehicle as in claim 11 wherein the sun gear and the drive system for driving the sun gear are mounted on the rotatable member.

16. A vehicle as in claim 10 wherein the shaft is hollow.

17. A vehicle comprising a chassis, a rotatable member mounted on the chassis, a shaft rotatably mounted relative to the rotatable member, a drive means for driving the shaft, a sun gear mounted on the shaft, a ring gear, means for fixedly mounting the ring gear on the chassis, at least two rotatable planet gears in engagement with the sun gear and the ring gear, the axes of rotation of the planet gears being substantially parallel, means mounting the planet gears on the rotatable member and coupling means for allowing the axis of rotation of the shaft to shift radially relative to the ring gear solely in directions substantially orthogonal to the axes of rotation of the planet gears within the coupling means comprises a member interposted between the drive means and the rotatable member, first interconnecting means mounted on the drive means for slidably engaging the coupling means and for preventing the rotation of the drive means with respect to the coupling means, and second interconnecting means mounted on the rotatable member for slidably engaging the coupling means and for preventing the rotation of the coupling means with respect to the rotatable member.

18. A vehicle as in claim 17 wherein the coupling means is a plate having at least two pairs of slots and the first and second interconnecting means are pins slidably received in the slots.

19. Drive means for causing relative rotation between the parts of structural elements comprising:
a first and second deck held in engagement with each other by bearings for rotational motion relative to each other;
an internal ring gear fixedly attached to the first deck, said internal ring gear containing two or more rotatably mounted planet gears, and a sun gear in driving relationship to each other;
a mounting structure supporting a motor and drive assembly;
shaft means supporting the sun gear adjacent one end and a drive assembly adjacent the other end;
the axes of rotation of said planet gears and said shaft means being substantially parallel;
means to couple said mounting structure to the second deck, the coupling means adapted to prevent rotation of the mounting structure relative to the second deck and to permit limited translational movement of the mounting structure relative to the second deck in radial directions relative to the rotational axis of the first and second decks with said axis of said shaft remaining parallel to said axis of said planet gears during said translational movement of said shaft.

20. Drive means for causing relative rotation between the parts of structural elements comprising:
a first and second deck held in engagement with each other by bearings for rotational motion relative to each other;
an internal ring gear fixedly attached to the first deck, said internal ring gear containing two or more rotatably mounted planet gears, and a sun gear in driving relationship to each other;
a mounting structure supporting a motor and drive assembly;
shaft means supporting the sun gear adjacent one end and a drive assembly adjacent the other end;
means to couple said mounting structure to the second deck, the coupling means adapted to prevent rotation of the mounting structure relative to the second deck and to permit limited translational movement of the mounting structure relative to the second deck in radial directions relative to the rotational axis of the first and second decks, said coupling means comprises:
a flat plate having a central opening through which the shaft passes and four slots radially extending from the periphery of the central opening at 90° to each other;
a pair of cams mounted on the mounting structure adapted to engage and move in two of the slots that are spaced 180° from each other; and
a pair of cams mounted on the first deck adapted to engage and move within the remaining two slots.

21. A drive means according to claim 20 wherein the planet gears are attached to the first deck by mounting means allowing radial movement of the planet gears with respect to the internal ring gear.

* * * * *